United States Patent [19]

Simmons

[11] Patent Number: 5,155,320
[45] Date of Patent: Oct. 13, 1992

[54] NON-REDRESSING WELDING NOSE DESIGN

[75] Inventor: Michael S. Simmons, Greer, S.C.

[73] Assignee: Tuffaloy Products, Inc., Greer, S.C.

[21] Appl. No.: 659,613

[22] Filed: Feb. 25, 1991

[51] Int. Cl.⁵ .............................................. B23K 11/30
[52] U.S. Cl. .................................. 219/120; 219/119
[58] Field of Search ................................ 219/120, 119

[56] References Cited

U.S. PATENT DOCUMENTS

| 3,689,731 | 9/1972 | Miller | 219/119 |
| 5,041,711 | 8/1991 | Prucher | 219/119 |

FOREIGN PATENT DOCUMENTS

| 2155205 | 5/1973 | France | 219/119 |
| 64-78683 | 3/1989 | Japan | 219/119 |
| 2-108474 | 4/1990 | Japan | 219/119 |

*Primary Examiner*—Geoffrey S. Evans
*Attorney, Agent, or Firm*—Reising, Ethington, Barnard, Perry & Milton

[57] ABSTRACT

A welding nose has a digital end and a root portion joined by a plurality of surface segments having a progressively increasing outside diameter for distributing welding loads in a radial direction and for forming a plurality of smooth surfaces joined at intersections to define preformed depressions for flow of metal grains from the base material of the welding nose for reducing formation of wings on the outermost diameter of the welding nose thereby to reduce sub-surface fracturing so as to maintain a desired mean diameter over extended periods of use.

5 Claims, 3 Drawing Sheets

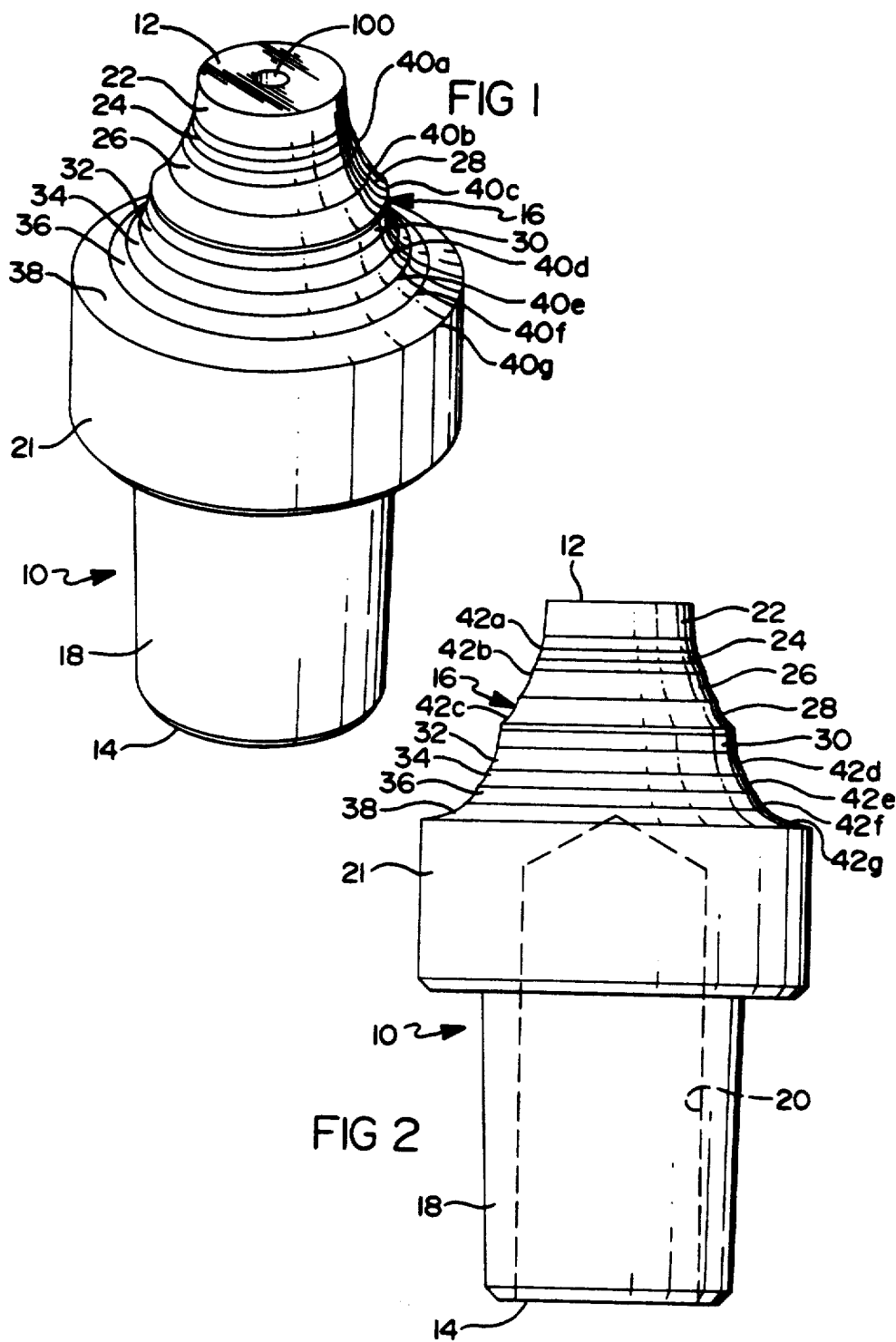

NON-REDRESSING WELDING NOSE DESIGN

FIELD OF THE INVENTION

This invention relates to welding noses for resistance welding electrodes and, more particularly, to welding noses which are subject to welding forces and differential thermal shock.

BACKGROUND OF THE INVENTION

Conventional resistance welding electrodes have a nose with a welding face formed on the distal end of the nose and a generally truncated cone surface formed on the outer surface of the nose. Such welding noses required periodic dressing to remove wing formations, pitting and other malformations formed on the outer surface during the welding process.

Welding electrode designs include a nose of copper formed of either copper-chromium or copper-chromium-zinc and any of the low alloy material variants of such copper material.

One problem with such prior cooper welding noses arises when the noses are used to resistance weld material having different thermal expansion properties than that of the base material of the welding nose or nose.

One example of such a welding process is in the resistance welding of galvanized steel where spaced electrodes are positioned on either side of workpieces and are moved to pressure a welding nose against the workpieces. Electrical current is pulsed through the electrodes heating the workpieces to spot weld the workpieces by forming a weld nugget therebetween. In such cases, the electrode nose dissipates heat from the work material by radiation and through conductive cooling at a water cooled shank. The nose has a cross-section to provide adequate strength to reduce metal fatigue.

In the past, smooth, cone shaped welding noses had a limited surface area for heat dissipation by radiation. Additionally, the reduced cross-sectional area and conically configured surface of such prior art noses could become fatigued.

Another characteristic of such prior art noses is that they are formed from extruded copper alloy bars. The extruded alloy bars have a metal structure in which the grains of the copper alloy material are arranged normal to the outer welding surface of the nose. There is a tendency for the metal grains in such nose designs to flow toward a void, e.g., the outer surface of the welding nose between the welding face and the base of the nose. Such grain flow creates wings of material at the O.D. of the nose that fracture when subject to differential thermal expansion between the material of the workpiece and the copper alloy material of the welding nose. The differential thermal expansion problem is especially noticeable when the copper alloy welding noses are used to resistance weld galvanized steel. In such cases, the zinc in the galvanizing material will alloy with the copper material of the welding nose. The wings contain sub-surface fractures due to either thermal shock produced by the large differences in the thermal expansion rates of copper alloys and the coated galvanized material or to alloy boundaries which are produced by migration of the zinc of the galvanized coating into the outer surface of the copper welding nose.

Another problem with such prior art copper spot welding noses is that pitting of the outer welding surface on the welding nose is caused by the coated material alloying with the copper in the welding nose or electrode. Such points of alloying will pull away from the electrode when the concentration of the coating material in the copper base material of the welding electrode becomes too great so as to produce surface pits. In the past, manufacturers have hardened the base material of the copper alloy welding electrode to prevent such pitting. Hardening, however, causes the electrode to become brittle with resultant fracturing when the electrode is subject to impact forces commonly produced as the electrode noses are pressed against the workpieces during a resistance spot welding process. Brittle material fractures can result. Such fracturing causes an increase in the growth rate of pitting of the welding surface of prior art spot welding noses.

Such sub-surface fracturing and surface pitting require continual dressing of the outer surface of the electrode's welding surface in order to maintain a specified mean button diameter (MBD) of the weld nugget. Such redressing interrupts the production welding cycle causing down time during the total life of the welding electrode.

SUMMARY OF THE INVENTION

An object of the present invention is to provide a non-dressing welding nose design for use in resistance welding which nose design increases the electrode life while limiting the need to dress the electrode to maintain a specified MBD.

Yet another object of the present invention is to provide a non-redressing resistance welding electrode which will maintain a specified MBD for the life of the electrode and which has a configuration at the outer welding surface which will improve weld nugget quality.

Still another object of the present invention is to provide a non-redressing resistance welding nose design which has a welding surface thereon that is configured to reduce formation of wings with sub-surface fractures parallel to the weld surface and which will dissipate more heat by radiation while defining preformed smooth indentations into which metal grains can flow during the welding process to slow pit growth on the welding surface via self-healing as well as to maintain the mean button diameter of the weld nugget.

A feature of the invention is to provide for such a non-redressing resistance welding nose having a plurality of stepped surfaces thereon which increase the surface area of the nose for improving radiation heat transfer therefrom and which surfaces are configured to disperse welding force on the electrode in a radial direction with respect to the longitudinal axis of the electrode to provide an increased load bearing surface on the electrode to reduce stress in the electrode nose while lessening metal fatigue in the electrode nose. The stepped surfaces include an abrupt change in direction at annular cusps thereon to counteract the formation of winged surface regions on the outer surface of the welding electrode thereby to remove wing formations on the electrode so as to maintain a specified mean button of the weld nugget over an extended period of use.

Yet another feature is to configure the stepped surfaces as smooth indentations for deterring the impregnation of the coating material of a workpiece into the base copper alloy of the welding electrode while forming a surface that allows flow of metal from the weld surface and allow flow of metal grains in the electrode nose to self-heal the welding surface of the electrode nose during the resistance welding process whereby the mean button diameter of the weld nugget nose is maintained.

Still another feature is to provide a resistance welding electrode having a resistance welding face that is engageable with a workpiece and which includes surface portions thereon for radiation cooling of the nose and for distributing force applied to the weld surface of the welding nose characterized by: the welding electrode nose having a longitudinal axis and a stepped outer surface thereon for increasing the surface area on the welding electrode nose; the outer surface including a plurality of stepped surfaces for increasing the surface area in a radial direction from the longitudinal axis of the welding electrode nose.

Yet another feature of the invention is to provide a resistance welding nose having a welding face that is engageable with a workpiece and which includes surface portions thereon for dissipating welding heat by radiation from the electrode and for distributing force applied to the welding electrode characterized by: the welding nose having a longitudinal axis and including a distal end and a root end; and a plurality of stepped annular surfaces on the welding nose formed between the distal end to the root end for spreading welding forces radially of the welding nose so as to reduce the stress levels therein.

Still another feature of the present invention is to provide a resistance welding nose having a welding face that is engageable with the workpiece and which includes surface portions thereon for dissipating welding heat by radiation from the welding nose and for distributing force applied to the weld surface of the welding nose characterized by: the welding nose having a distal end and a root portion and including a longitudinal axis therethrough; the surface portions including a series of stepped outer surface segments on the welding nose each having a progressively increasing diameter for distributing welding forces radially of the welding nose and forming surface indentations adapted to be filled by flowing outer grains of metal from the welding surface of the welding nose into the surface indentations thereby to reduce the amount of grain metal material moving to the outside diameter of the welding nose so as to reduce wing formations on the welding nose and slow the pit growth for maintaining a desired mean button diameter in a weld nugget for extended periods of use.

Another feature of the present invention is to provide a resistance welding nose having a resistance welding face that is engageable with a workpiece and which includes surface portions thereon for transferring heat from the nose and for distributing force applied to the weld surface of the welding nose characterized by: the welding nose having a distal end and a root portion and including a longitudinal axis therethrough; a first outer surface on the welding nose forming a radial surface from the distal end to a plane transverse to and axially spaced from the distal end; a second series of outer surface segments on the welding nose located axially inboard of the first outer surface and each of the second series of outer surface segments having a progressively increasing diameter for distributing welding forces radially of the welding nose and forming surface indentations adapted to be filled by metal from a weld surface and for receiving flowing grains of metal from the welding surface of the welding nose into the surface indentations thereby to reduce the movement of grains of metal toward the outside diameter of the welding nose so as to reduce wing formations and slow pitting growth on the welding nose for maintaining a desired mean button diameter in a weld nugget.

Still another feature of the present invention is to provide a non-redressing welding nose comprising a distal end and a root portion; the welding nose having an outer surface formed thereon including stepped annular surfaces of increasing diameter from the welding face of the welding nose means for distributing welding force radially outwardly of the welding nose; the outer surface further including a series of abrupt steps to remove any wing formation that may occur, the steps preforming shallow annular indentations for directing metal grain flow so as to reduce formation of wing formations which combined with the distribution of welding force combines to maintain a desired mean diameter for extended periods of use.

These and other objects, advantages and features of the invention will become more apparent when taken in conjunction with the following description and the accompanying drawings wherein:

BRIEF DESCRIPTION OF THE DRAWINGS

FIG. 1 is a perspective view of one embodiment of the present invention;

FIG. 2 is a side elevational view of the embodiment of FIG. 1;

DETAILED DESCRIPTION OF PREFERRED EMBODIMENTS OF THE INVENTION

Figure 3:
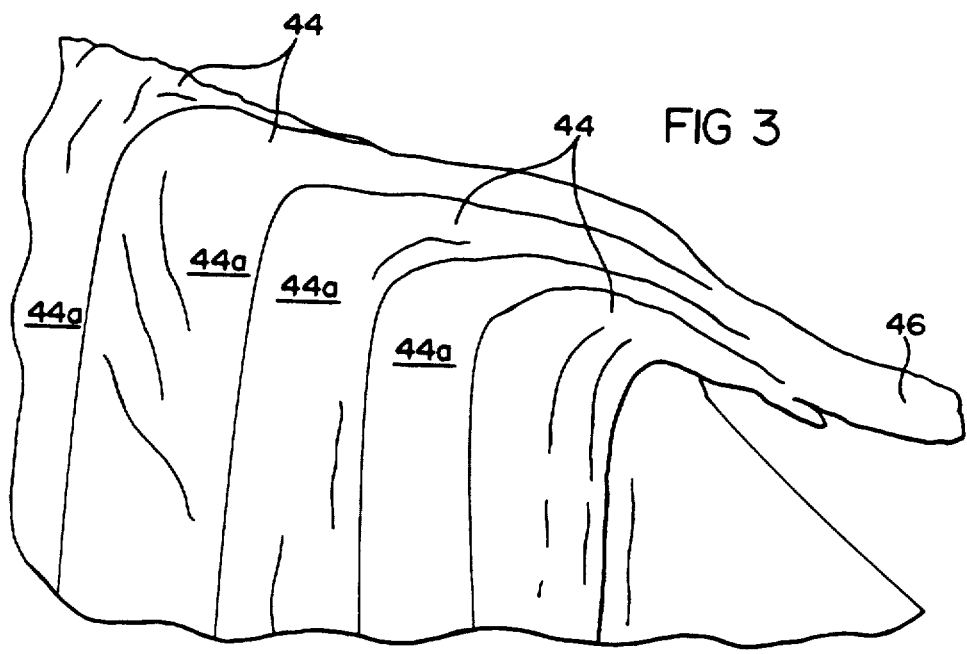
FIG. 3 is a diagrammatic view of a standard resistance welding nose showing grain flow therein creating wings of metal on the outer diameter surface.

Referring now to FIGS. 1 and 2, an electrode 10 is illustrated having a welding face 12 on its distal end and base 14. A welding nose 16 is connected on a shank 18 having a water hole 20 therein. The welding nose 16 extends from the welding face 12 to an enlarged diameter root portion 21 which fits over the end of the shank 18 for connection thereto.

In accordance with the present invention, the welding nose 16 includes a first outer surface segment 22 thereon formed as a segment of a truncated cone with a slightly diverging shape from the welding face. A series of stepped radial surfaces 24, 26, 28 of increasing diameter are formed on the nose 16 between surface segment 22 and the root portion 21. The surface 28 merges with a second outer surface segment 30 of a truncated cone shape slightly diverging from the surface 28 to a second series of stepped radial indentations 32, 34, 36, 38. Each of the aforedescribed surfaces intersect at abrupt changes in direction defined by annular cusps 40a–40g. The cusps 40a–40g form abrupt changes in direction between smooth annular indentations 42a–42g. The indentations 42a–42g define concave regions into which weld metal flows during resistance welding. The smooth surface tends to deter material from the workpiece impregnating the copper of the electrode nose 16.

Additionally, an increasing diameter of each of the stepped surfaces 24-28 and 32-38 increases the surface area on the welding nose for improved radiant heat transfer cooling of the welding nose 16 during a resistance welding process. Furthermore, the increasing diameter of the stepped surfaces causes welding forces applied generally along the longitudinal axis of the welding nose 16 to be dispersed radially of the welding nose 16 through an extended load bearing surface so as to reduce metal stress in the welding nose 16 thereby to reduce metal fatigue therein.

A further feature of the present invention is that the indentations 41a-42c and 42d-g start a controlled-smooth region for receiving any flow of metal grains from the copper alloy of the welding nose 16. Additionally, the smoothness of these surfaces hinders undesired alloying of the metal grains by the workpiece material. This is especially true in the case of zinc containing coated galvanized materials being welded by the welding nose 16.

Figure 4:
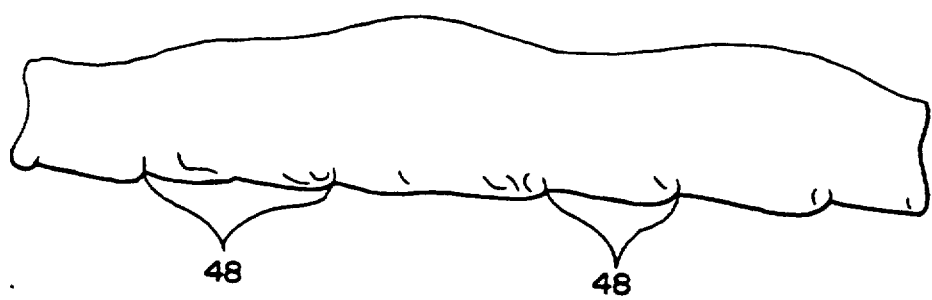
FIG. 4 is a diagrammatic view of such wings with sub-surface fractures parallel to the weld surface.

Heretofore, the grain material of a prior art welding nose (with metal grains 44a normal to the outer surface) had a tendency to fill voids during the welding process. Consequently, grain flow tended to move to the O.D. of the prior art electrodes as shown in FIGS. 3 and 4 at reference numeral 44 to form "wings" 46 on the O.D. of the electrode.

Indentation 100 shown at the tip of the electrode in FIG. 1 is configured such that a percentage of the grain flow is directed toward the center of the welding nose 16 by filling the indentation. Such filling reduces the amount of copper moving to the outside diameter of the welding nose 16 and there is resultant reduction of wing formation which are susceptible to subsurface fracturing as shown at 48 in FIG. 4.

Figure 5:
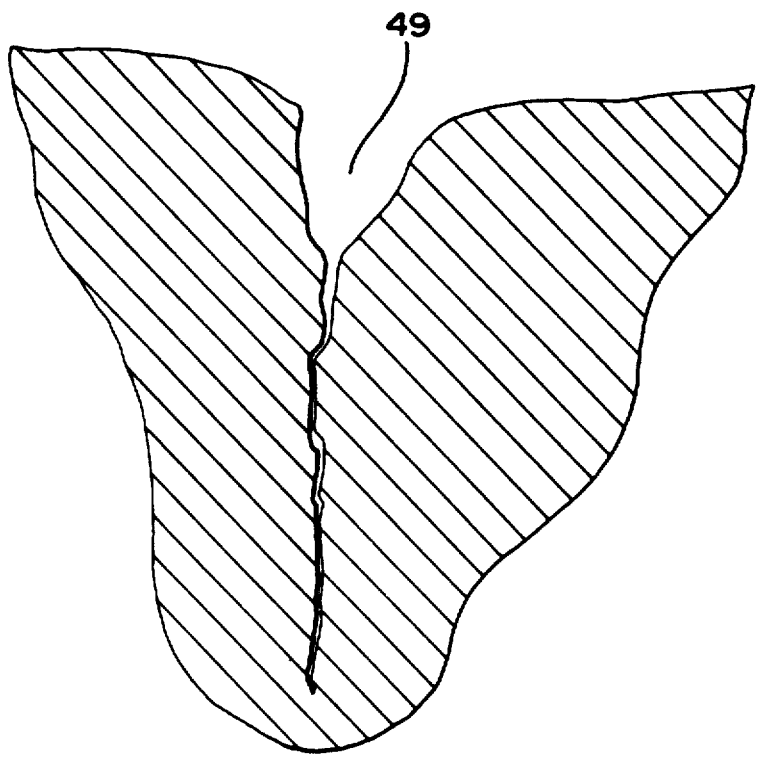
FIG. 5 is a diagrammatic view of a copper aluminum oxide electrode with a surface fracture formation therein.

Grain flow into the indentation 100 also tends to heal pit formation in the O.D. of a welding nose as shown at 49 in FIG. 5.

Figure 6:
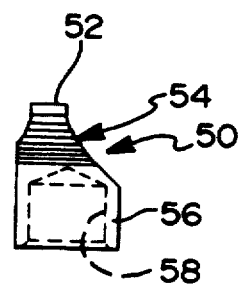
FIGS. 6-8 are side elevational views of four other embodiments of the present invention.

In the embodiment of the invention shown in FIG. 6, a stepped surface welding nose 50 is illustrated including a welding face 52 and a series of progressively increasing diameter stepped surfaces 54 located asymmetrically with respect to the longitudinal axis of the welding nose 50. A shank 56 is connected to the base of the welding nose 50 for arranging a water hole 58 in close proximity to the offset metal of the stepped surfaces 54.

Figure 7:
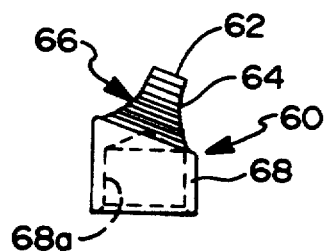

In the embodiment of the invention shown in FIG. 7, a stepped surface welding nose 60 is illustrated including a welding face 62 on a bent nose 64 having a plurality of stepped annular surfaces 66 thereon configured like the annular surfaces in the prior embodiments but being formed on a longitudinal axis inclined at an angle to a shank 68 having a water hole 68a formed therein.

Figure 8:
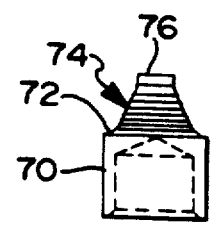

The embodiment of FIG. 8 is like the embodiment of FIGS. 1 and 2 but is configured to have a shank 70 corresponding to the diameter of the base 72 of a series of stepped, curved surfaces 74 that have an increasing diameter from a welding face 76 axially inwardly thereof toward the base 72.

While various embodiments of the invention are illustrated it will be understood that the principles of the present invention including use of a series of stepped surfaces for spreading welding forces and to form preshaped indentations for controlling metal grain flow are possible within other forms and material types of welding electrodes. The aforesaid features, shapes and formations are all characteristic of an electrode having a specified MBD which is maintained during the life of the welding nose without redressing the surface of the welding nose and wherein the total life of the welding nose is extended while improving the weld nugget quality because of the increased ability to cool the nose by radiation cooling. The maintenance of a desired specified MBD for a given welding application is applicable to either standard work materials or work materials having a protective coating such as galvanized steel. The aforesaid embodiments described herein and illustrated in the drawings are understood to be examples of the invention and that other equivalents are contemplated all as encompassed within the scope of the appended claims.

What is claimed is:

1. A resistance welding nose having a water cooled base and a resistance welding nose that is engageable with a workpiece and which includes surface portions thereon for transferring heat from the workpiece to the water cooled base and for distributing force applied to the weld surface of the welding nose characterized by:
    said welding nose having a longitudinal axis and a plurality of surfaces on said welding nose increasing the surface area of said nose in a radial direction from the longitudinal axis of said welding nose from said tip to the vicinity of said water cooled base.

2. A resistance welding nose having a water cooled base and a resistance welding nose that is engageable with a workpiece and which includes surface portions thereon for transferring heat from the nose to the water cooled base and for distributing force applied to the weld surface of the welding nose characterized by:
    said welding nose having a longitudinal axis and including a distal end and a root end;
    a plurality of annular surfaces on said welding nose formed from said distal end to said root end for spreading welding forces radially on said welding nose.

3. A resistance welding nose having a water cooled base and a resistance welding nose that is engageable with a workpiece and which includes surface portions thereon for transferring heat from the nose to the water cooled base and for distributing force applied to a weld surface characterized by:
    said welding nose having a distal end and a root portion and including a longitudinal axis therethrough;
    means forming a series of outer surface segments on said welding nose each having a progressively increasing diameter for distributing welding forces radially of said welding nose; said outer surface segments forming surface depressions adapted to be filled by flow of grains of metal from the welding surface of said welding nose into the surface depressions thereby to reduce the formation of metal grain growth on the welding nose so as to maintain a desired mean button diameter over extended periods of us.

4. A resistance welding nose having a water cooled base and a resistance welding nose that is engageable with a welding pool on a workpiece and which includes surface portions thereon for transferring heat from the nose to the water cooled base and for distributing force applied to a weld surface of the welding nose characterized by:
    said welding nose having a distal end and a root portion and including a longitudinal axis therethrough;
    a first outer surface on said welding nose forming a truncated surface from said distal end to a plane transverse to and axially spaced from said distal end;

means forming a second series of outer surface segments on said welding nose axially inboard of said first outer surface and each having a progressively increasing diameter for distributing welding forces radially of said welding nose and forming surface depressions adapted to be filled by flow of outer grains of metal from the welding surface of said welding nose into the surface depressions thereby to reduce formation of metal grain growth on the welding nose so as to maintain a desired mean button diameter over extended periods of use.

5. A non-redressing welding nose comprising a distal end and a root portion;

means forming a water cooling passage in said root portion;

a welding nose formed axially inboard of said distal end;

said welding nose having an outer surface formed thereon including means for distributing welding force radially outwardly of said welding nose; said outer surface further including a plurality of annular smooth surfaces intersecting to form a plurality of annular cusps to deter work material from impregnating the base material of said welding nose;

said annular smooth surfaces having indentations between said cusps forming depressions for receiving metal grain flow so as to reduce formation of metal grain growth on the outermost diameter of the welding nose.

* * * * *